United States Patent [19]

Kano

[11] Patent Number: 5,566,275
[45] Date of Patent: Oct. 15, 1996

[54] CONTROL METHOD AND APPARATUS USING TWO NEURAL NETWORKS

[75] Inventor: Makoto Kano, Urayasu, Japan

[73] Assignee: Kabushiki Kaisha Toshiba, Japan

[21] Appl. No.: 199,014

[22] Filed: Feb. 18, 1994

Related U.S. Application Data

[63] Continuation-in-part of Ser. No. 929,111, Aug. 13, 1992, Pat. No. 5,428,559.

[30] Foreign Application Priority Data

Aug. 14, 1991 [JP] Japan .................................. 3-204494
Feb. 19, 1993 [JP] Japan .................................. 5-030580
Feb. 26, 1993 [JP] Japan .................................. 5-46205

[51] Int. Cl.$^6$ .............................. G05B 19/04; G06E 1/00
[52] U.S. Cl. ............................... 395/81; 395/80; 395/84; 395/96; 395/23; 382/153; 382/157
[58] Field of Search ................................ 395/96, 21, 22, 395/81, 9, 80, 84, 23; 382/153, 157

[56] References Cited

U.S. PATENT DOCUMENTS 4,990,838   2/1991   Kawato et al. ..................... 318/568.1

FOREIGN PATENT DOCUMENTS

WO90/10270   7/1990   WIPO .

OTHER PUBLICATIONS

Leahy, M. B., et al, "Neurla Network Payload Estimation for adaptive robot control," IEEE Trans. on NN, V.2, N. 1. Jan. 1991, pp. 93–100.

Kawato, M. et al, "Hierarchical NN Model for voluntary movement with application to robotics," IEEE Control System Magazine, Apr. 30, 1988, pp. 8–15.

Franklin, J. A., "Refinement of robot motor skills through reinforcement learning," Proc. of 27th IEEE CDC, 1988, pp. 1096–1101.

Handelman, D. A., et al, "Integrating NNs and knowledge--based systems for intelligent robotic control," IEEE Control Systems Magazine, Apr. 30, 1990, pp. 77–87.

Rabelo, L. C., "Hierarchical Neurocontroller . . . ", Proc. of IEEE Int. Conf. on Robotics and Automation, Apr. 1991, pp. 2656–2661.

*Primary Examiner*—Robert W. Downs
*Assistant Examiner*—A. Katbab
*Attorney, Agent, or Firm*—Banner & Allegretti, Ltd.

[57] ABSTRACT

A control method of controlling a controlled system according to the invention comprises the first step of inputting a current and future target controlled variable to a first neural network model which performs learning using a past target controlled variable for the controlled system as an input signal and a past manipulated variable as a teacher signal, thereby obtaining a current virtual manipulated variable, the second step of causing a second neural network model, which have learnt to predict a behavior of the controlled system, to receive the virtual manipulated variable obtained in the first step and a controlled variable obtained from the controlled system at a current time, thereby obtaining a predicted controlled variable, the third step of obtaining an error of the predicted controlled variable obtained in the second step with respect to the target controlled variable, the fourth step of obtaining a correction amount for the virtual manipulated variable in accordance with a back propagation calculation of the second neural network model, using the error obtained in the third step, thereby correcting the virtual manipulated variable with the correction amount, and the fifth step of outputting the virtual manipulated variable corrected in the fourth step to the controlled system.

16 Claims, 5 Drawing Sheets

CONTROL METHOD AND APPARATUS USING TWO NEURAL NETWORKS

CROSS-REFERENCES TO THE RELATED APPLICATIONS

This application is a continuation-in-part of U.S. patent application Ser. No. 07/929,111 filed on Aug. 13, 1992, now U.S. Pat. No. 5,428,559.

BACKGROUND OF THE INVENTION

1. Field of the Invention

The present invention relates to a control method and apparatus, using a neural network model, for controlling a nonlinear controlled system such as a manipulator.

2. Description of the Related Art

A conventional method of controlling a nonlinear controlled system such as a manipulator is exemplified by a method of combining nonlinear compensation and feedback control and an inverse problem technique for obtaining a manipulated variable from a mathematical model (especially a mathematical model of dynamic characteristics) of a nonlinear controlled system. In these methods, accurate control cannot be performed if a mathematical model for a controlled system is unknown.

Several methods are proposed as a method of controlling a nonlinear controlled system using a neural network model. According to a control method using a neural network model, control can be achieved by acquiring the dynamic characteristics of a controlled system by learning a neural network model even if a mathematical model of the controlled system is unknown. A conventional control method using a neural network model, however, is feed-forward control for calculating a manipulated variable from a target controlled variable or quantity. For this reason, a shift in target controlled variable caused by a disturbance cannot be compensated.

As described above, in the conventional method of combining nonlinear compensation and feedback control and the conventional method using the inverse problem technique, accurate control cannot be performed if a mathematical model for a nonlinear controlled system is not known. Therefore, a deviation of a controlled variable caused by a disturbance cannot be compensated by the method using the neural network model.

SUMMARY OF THE INVENTION

It is an object of the present invention to provide a control method and apparatus using a neural network model and capable of accurately controlling a controlled system (especially a nonlinear controlled system) whose mathematical model is unknown, and compensating for a deviation of a controlled variable caused by a disturbance.

A control method of controlling a controlled system according to the present invention is characterized by the first step of inputting current and future target controlled variables to a first neural network model and causing the first neural network model to execute a forward calculation to output a virtual manipulated variable initial value; the second step of causing a second neural network model to receive the virtual manipulated variable initial value obtained in the first step and a controlled variable obtained from said controlled system at a current time, and causing the second neural network model to execute a forward calculation to output a predicted controlled variable; the third step of obtaining an error of the predicted controlled variable obtained in the second step with respect to the target controlled variable; the fourth step of obtaining a correction amount for the virtual manipulated variable in accordance with a back propagation calculation of said second neural network model using the error obtained in the third step, thereby correcting the virtual manipulated variable in accordance with the correction amount; the fifth step of outputting the virtual manipulated variable corrected in the fourth step to the controlled system as a manipulated variable; and the sixth step of causing the first neural network model to perform learning in an error back propagation learning method, using as a teacher signal the virtual manipulated variable output to the controlled system.

The third step is characterized by including the step of obtaining an error of the predicted controlled variable with respect to the target controlled variable on the basis of at least one of a predicted controlled variable after one sampling period and a predicted controlled variable after two sampling period.

The fifth step is characterized by including at least one of the step of outputting the corrected virtual manipulated variable to the controlled system after the second to fourth steps are repeated by a predetermined number of times, and the step of outputting the corrected virtual manipulated variable to the controlled system after the second to fourth steps are repeated until the error of the predicted controlled variable with respect to the target controlled variable reaches not more than a predetermined value.

Another control method of controlling a controlled system according to the present invention is characterized by comprising: the first step of preparing a second neural network model having learnt to predict a behavior of the controlled system; the second step of inputting current and future target controlled variables to a first neural network model and causing the first neural network model to execute a forward calculation to output a virtual manipulated variable initial value; the third step of causing the second neural network model to receive the virtual manipulated variable initial value obtained in the first step as a virtual manipulated variable and a controlled variable obtained from said controlled system at a current time, and causing the second neural network model to execute forward calculation to output a predicted controlled variable; the fourth step of obtaining an error of the predicted controlled variable obtained in the third step with respect to the target controlled variable; the fifth step of obtaining a correction amount for the virtual manipulated variable in accordance with a back propagation calculation of said second neural network model, using the error obtained in the fourth step, thereby correcting the virtual manipulated variable with the correction amount; the sixth step of outputting the virtual manipulated variable corrected in the fifth step to the controlled system as a manipulated variable; and the seventh step of causing the first neural network model to perform learning in an error back propagation learning method, using as a teacher signal the virtual manipulated variable output to the controlled system.

A control apparatus for controlling a controlled system according to the present invention is characterized by comprising: a first neural network model for receiving current and future target controlled variables to obtain a virtual manipulated variable initial value; second step of causing the second neural network model to receive a controlled variable by the controlled system and a virtual manipulated variable, in this a virtual manipulated variable initial value is set as an initial value, obtained by the first neural network model and outputting a predicted controlled variable by an output calculation; and means for obtaining a corrected virtual manipulated variable using the correction value and the virtual manipulated variable and outputting the corrected virtual manipulated variable to the controlled system. The control apparatus is characterized by further comprising a subtracter for subtracting the predicted controlled variable obtained in the second neural network model from the future target controlled variable and outputting a difference to the second neural network model, and is characterized by further comprising an integrator for accumulating the virtual manipulated variable and the correction amount; a first switch for selectively switching an output from the first neural network model and an output from the second neural network model so as to receive the virtual manipulated variable and the correction amount; and a second switch for supplying an output from the integrator to the controlled system under a predetermined condition.

The first neural network model calculates a correction amount of a coupling weight value by performing a learning calculation which uses a manipulated variable as a teacher signal, after the manipulated variable is supplied to the controlled system as each sampling time, and corrects the coupling weight value after completion of a sequence of control operations.

The second neural network model is characterized by performing the learning in advance to predict a behavior of the controlled system, and is characterized by including means for receiving the virtual manipulated variable and the current controlled variable to obtain a predicted controlled variable; means for obtaining an error of the predicted controlled variable with respect to the target controlled variable; and means for obtaining a correction amount for the virtual manipulated variable using the error. The means of obtaining an error is characterized by including means for obtaining an error of the predicted controlled variable with respect to the target controlled variable on the basis of at least one of a predicted controlled variable after one sampling period and a predicted controlled variable after two sampling period.

In addition, the second neural network model is characterized by including means for outputting the virtual manipulated variable to the controlled system when the error reaches not more than a predetermined value.

According to the present invention, the first neural network model outputs a virtual manipulated variable initial value, and then a current virtual manipulated variable can be predicted on the basis of a current virtual manipulated variable obtained by the controlled system and a virtual manipulated variable, in which the virtual manipulated variable initial value is an initial value by the second neural network. In addition, the correction amount of the virtual manipulated variable can be calculated from an error between a target controlled variable and the predicted value of the controlled variable in accordance with an error back propagation calculation of the second neural network model. According to the present invention, therefore, the forward calculation and the error back propagation calculation of the second neural network model are repeated to correct the virtual manipulated variable. The correction result serves as a manipulated variable for the nonlinear controlled system. As a result, accurate control of a controlled system a mathematical model of dynamic characteristics of which is unknown and a controlled system having highly nonlinear dynamic characteristics can be performed.

In the forward calculation of the second neural network model, the currently observed controlled variable and the virtual manipulated variable are input to predict a controlled variable. The correction amount of the virtual manipulated variable is calculated by the error back propagation calculation such that this predicted controlled variable comes closer to the target controlled variable. Even if a deviation of a controlled variable occurs due to a disturbance, the virtual manipulated variable can be immediately corrected to eliminate this shift.

When learning by the first neural network model progresses, the first neural network model can output a value which is close to a manipulated variable that enables the input target controlled variable. Therefore, an accurate manipulated variable can be obtained by a small repetition count of the forward and error back propagation calculations of the second neural network model.

As described above, according to the present invention, there is provided a control method and apparatus, using a neural network model, capable of accurately controlling a nonlinear controlled system a mathematical model of dynamic characteristics of which is unknown and a nonlinear controlled system having highly nonlinear dynamic characteristics.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Figure 1:
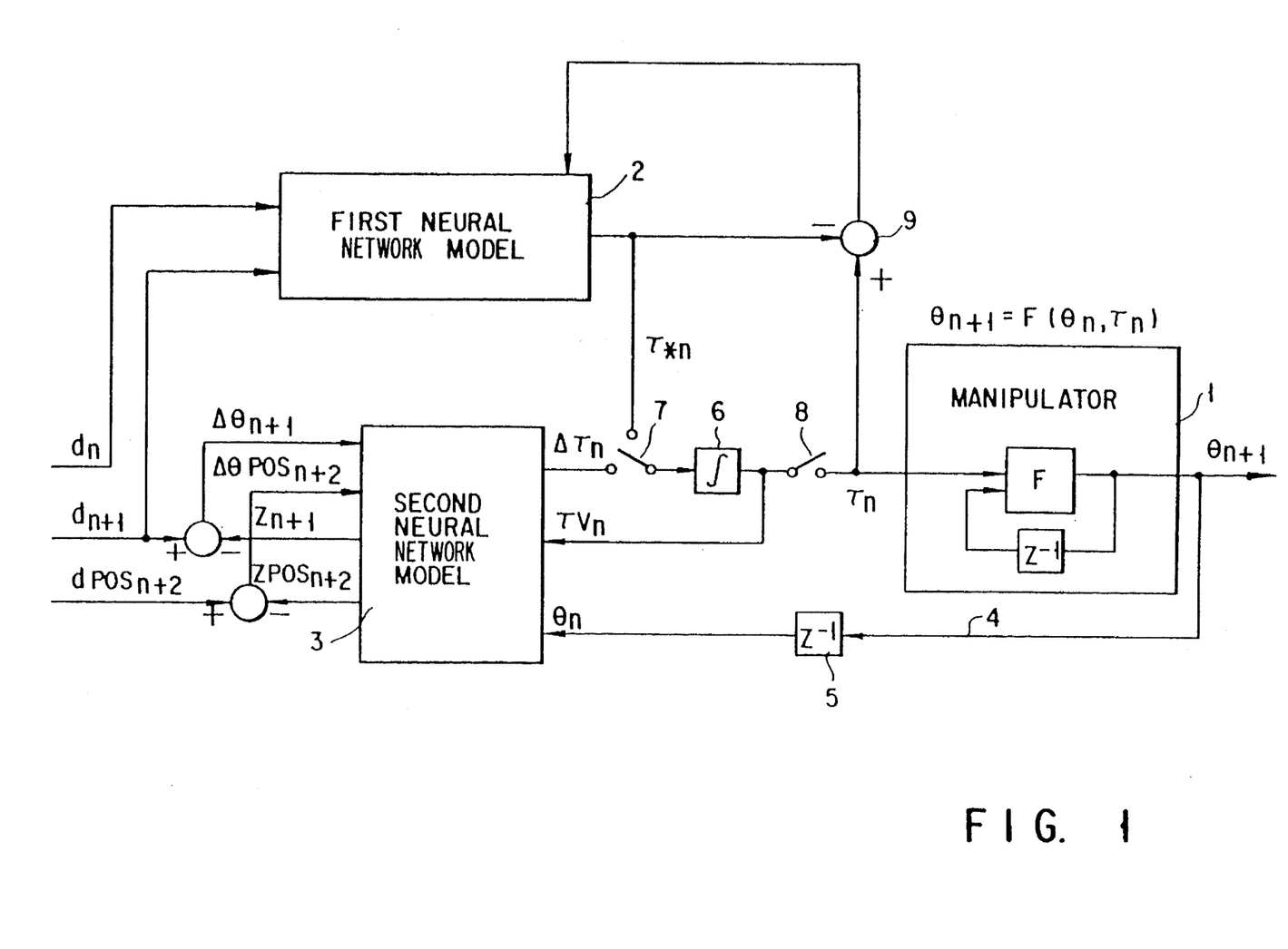
FIG. 1 is a schematic block diagram showing a control apparatus according to an embodiment of the present invention.

FIG. 1 is a schematic block diagram showing a control apparatus according to an embodiment of the present invention.

A two-joint manipulator is exemplified as a controlled system according to this embodiment. However, the present invention is not limited to this, but is also applicable to a multijoint manipulator or process control. In this embodiment, assume that the two-joint manipulator moves on the x-y plane in FIG. 2 to perform track follow-up control for causing the manipulator to follow up a target joint angle track for $T_f$ from time 0 to time $N\Delta t$ ($=T_f$).

The control apparatus shown in FIG. 1 comprises a manipulator 1, a first neural network model 2, a second neural network model 3, a feedback loop 4, a time delay element 5 in the feedback loop 4, an integrator 6, a first switch 7, a second switch 8, and a subtracter 9. The subtracter 9 generates an error signal input used for learning of a first neural network model.

Figure 2:
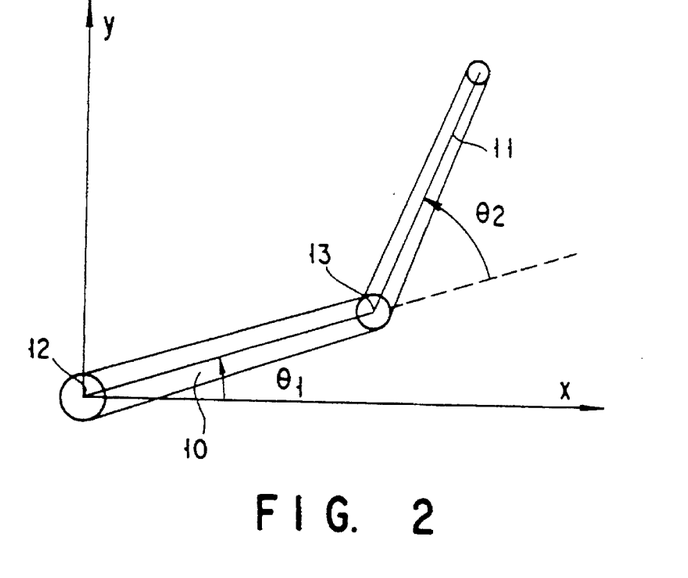
FIG. 2 is a view showing a two-joint manipulator moving on a plane, which manipulator serves as a nonlinear controlled system.

As shown in FIG. 2, the manipulator 1 comprises a first link 10, a second link 11, a first joint 12, and a second joint 13. The angle formed between the first link 10 and the x-axis is defined as a first joint angle $\theta_1$, and the angle formed between the second link 11 and an extended line of the first link 10 is defined as a second joint angle $\theta_2$. A first joint torque $\tau_1$ acts on the first joint 12 in the positive direction of the joint angle, and a second joint torque $\tau_2$ acts on the second joint 13 in the positive direction of the joint angle. The manipulator 1 receives a manipulated variable vector $\tau_n = (\tau_{1,n}, \tau_{2,n})^T$ (where $\tau_{1,n}$ is the first joint torque at time $n\Delta t$, $\tau_{2,n}$ is the second joint torque at time $n\Delta t$, and the manipulated variable vector $\tau_n$ is a vector having the first and second joint torques as its elements), and measures a controlled variable vector $\theta_n = (\theta_{1,n}, \theta_{2,n}, \Theta_{1,n}, \Theta_{2,n})^T$ (where $\theta_{1,n}$ is the first joint angle at time $n\Delta t$, $\theta_{2,n}$ is the second joint angle at time $n\Delta t$, $\Theta_{1,n}$ is the first joint angular velocity at time $n\Delta t$, and $\Theta_{2,n}$ is the second joint angular velocity at time $n\Delta t$). The motion equation of the manipulator 1 is represented as $\theta_{n+1} = F(\theta_n, \tau_n)$. In this case, the controlled variable vector $\theta_n$ represents a vector having the joint angles $\theta_{1,n}$ and $\theta_{2,n}$ and the angular velocities $\Theta_{1,n}$ and $\Theta_{2,n}$ as its elements.

Figure 3:
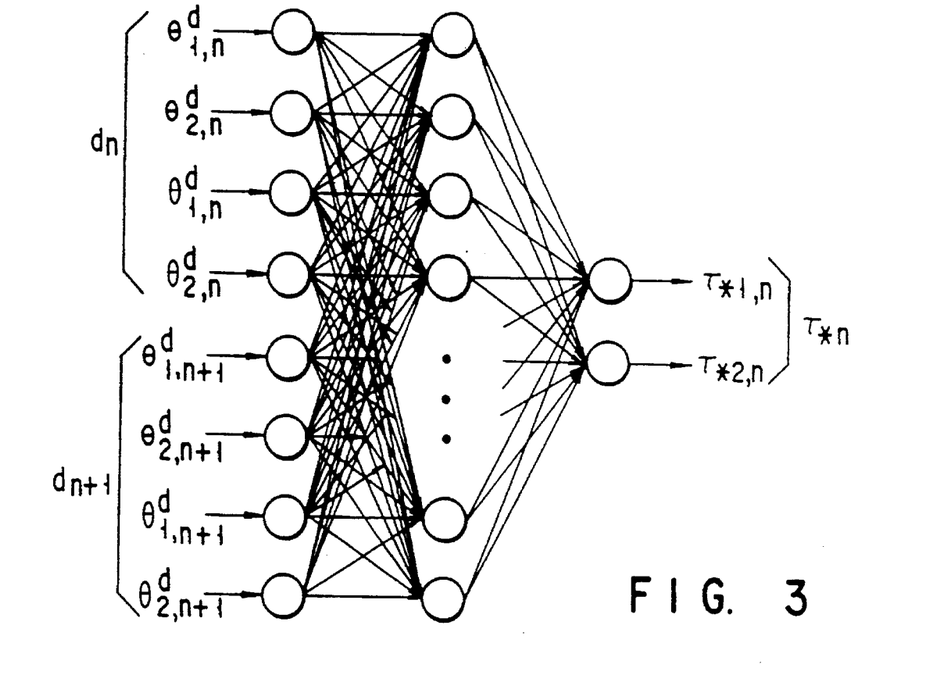
FIG. 3 is a view showing input/output signals in a forward calculation of a first neural network model.

The first neural network model 2 will be described with reference to FIG. 3. FIG. 3 shows the first neural network model 2 constituted by a three-layered neural network model.

The first neural network model 2 receives a target controlled variable $d_n$ at current time $n\Delta t$ and a target controlled variable $d_{n+1}$ after one sampling period, and outputs a virtual manipulated variable initial value $\tau_{*n}$ in accordance with a forward calculation. The virtual manipulated variable initial value $\tau_{*n}$ is input to the integrator 6 as an initial value. The first neural network model 2 performs learning using, as a teacher signal (i.e., a signal $(\tau_n - \tau_{*n})$ is used as an error signal), the manipulated variable $\tau_n$ input from the integrator 6 to the manipulator 1 every sampling time, in accordance with the error back propagation method. That is, a coupling weight vector w1 as a parameter in the first neural network model 2 is corrected in accordance with the learning error signal $(\tau_n - \tau_{*n})$ input from the subtracter 9 to the first neural network model 2. The calculation of the error back propagation method will be described in detail later.

The second neural network model 3 will be described with reference to FIGS. 4 and 5. In this embodiment, the second neural network model 3 is a three-layered neural network model.

The second neural network model 3 receives a virtual manipulated variable $\tau vn = (\tau 1, n, \tau 2, n)^T$ and a controlled variable $\theta n = (\theta 1, n, \theta 2, n, \Theta 1, n, \Theta 2, n)^T$ fed back by way of the feedback loop 4 and computes, by forward calculation, a predicted control variable $z_{n+1} = (z_1, n+1, z_2, n+1, Z_1, n+1, Z_2, n+2)^T$ which is after one sampling period, and a predicted joint angle $zpos_{n+2} = (z_1, n+2, z_2, n+2)$ which is after two sampling periods. The sum of the squares of the differences between predicted controlled variables $(z_{n+1}, zpos_{n+2})$ obtained by the forward calculation executed by the second neural network model and a target control value $(d_{n+1}, dpos_{n+2})$ is defined as error function $E2_n$:

$$E2_n = \tfrac{1}{2}(\Delta\theta^T_{n+1}\Delta\theta_{n+1} + \Delta\theta pos^T_{n+2} \Delta\theta pos_{n+2})$$

$$\Delta\theta_{n+1} = d_{n+1} - z_{n+1}$$

$$\Delta\theta pos_{n+2} = dpos_{n+2} - zpos_{n+2}.$$

A correction amount $\Delta\tau n$ of a manipulated variable is computed by causing the second neural network model to execute an error back propagation calculation on the basis of an error function $E2_n$.

Figure 4:
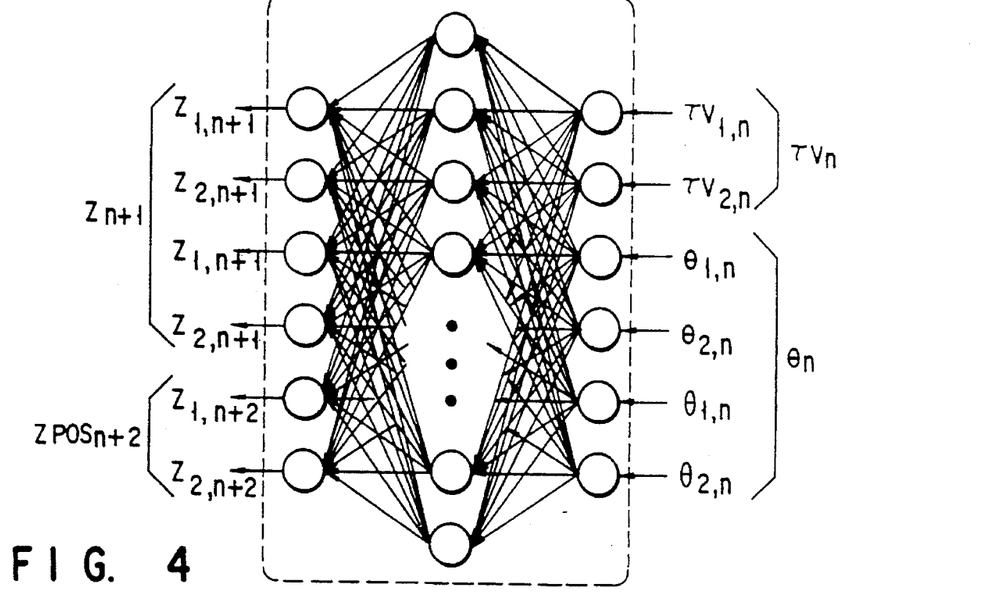
FIG. 4 is a view showing input/output signals in a forward calculation of a second neural network model.
Figure 5:
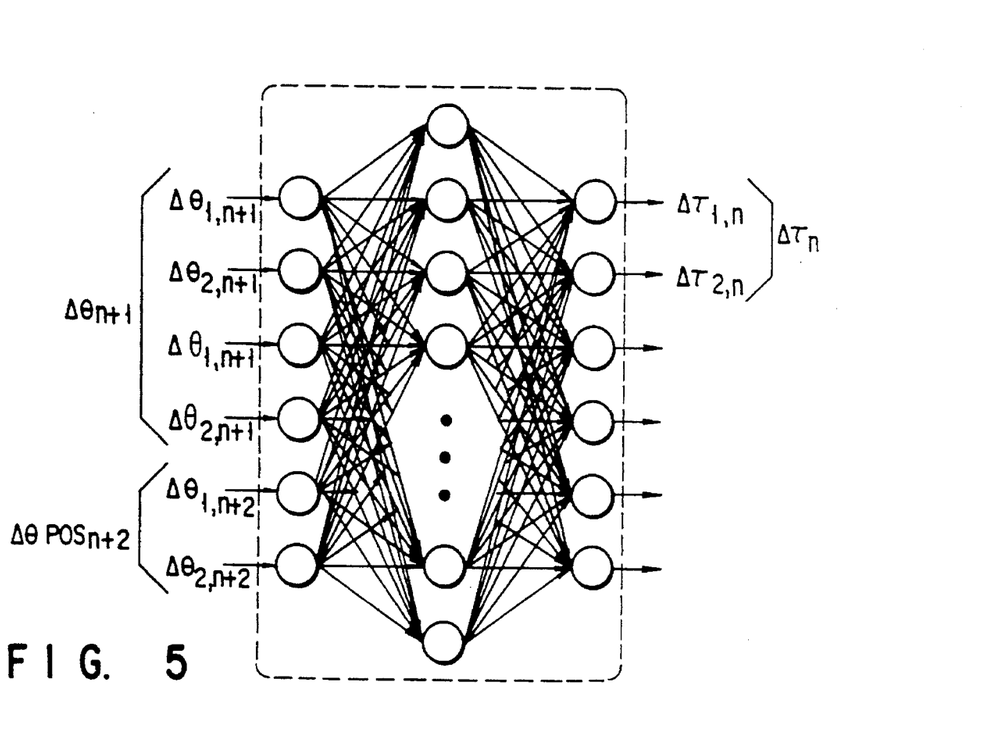
FIG. 5 is a view showing input/output signals in a back propagation calculation of the second neural network model.

FIGS. 4 and 5 show the states of the second neural network mode 3. FIG. 4 shows the state in the forward calculation, and FIG. 5 show the relationship between the inputs and outputs in the error back propagation calculation. The forward calculation and the error back propagation calculation will be described in detail later.

The feedback loop 4 feeds back the controlled variable $\theta_{n+1}$ calculated for the manipulator 1 as the controlled system to the second neural network model 3 through the time delay element 5.

The integrator 6 sequentially accumulates inputs input through the first switch 7. In each sampling operation, the second switch 8 is closed, and an output from the integrator 6 is input as a manipulated variable to the manipulator 1 serving as the controlled system. Thereafter, the output from the integrator 6 is reset to zero, and the first switch 7 is switched to the output side of the first neural network model 2. That is, the first input signal to the integrator 6 is the virtual manipulated variable initial value $\tau_{*n}$ output from the first circuit model 2. The first switch 7 is then switched again to input the correction amount $\Delta\tau_n$ from the second neural network model 3 to the integrator 6 through the first switch 7.

Figure 6A:
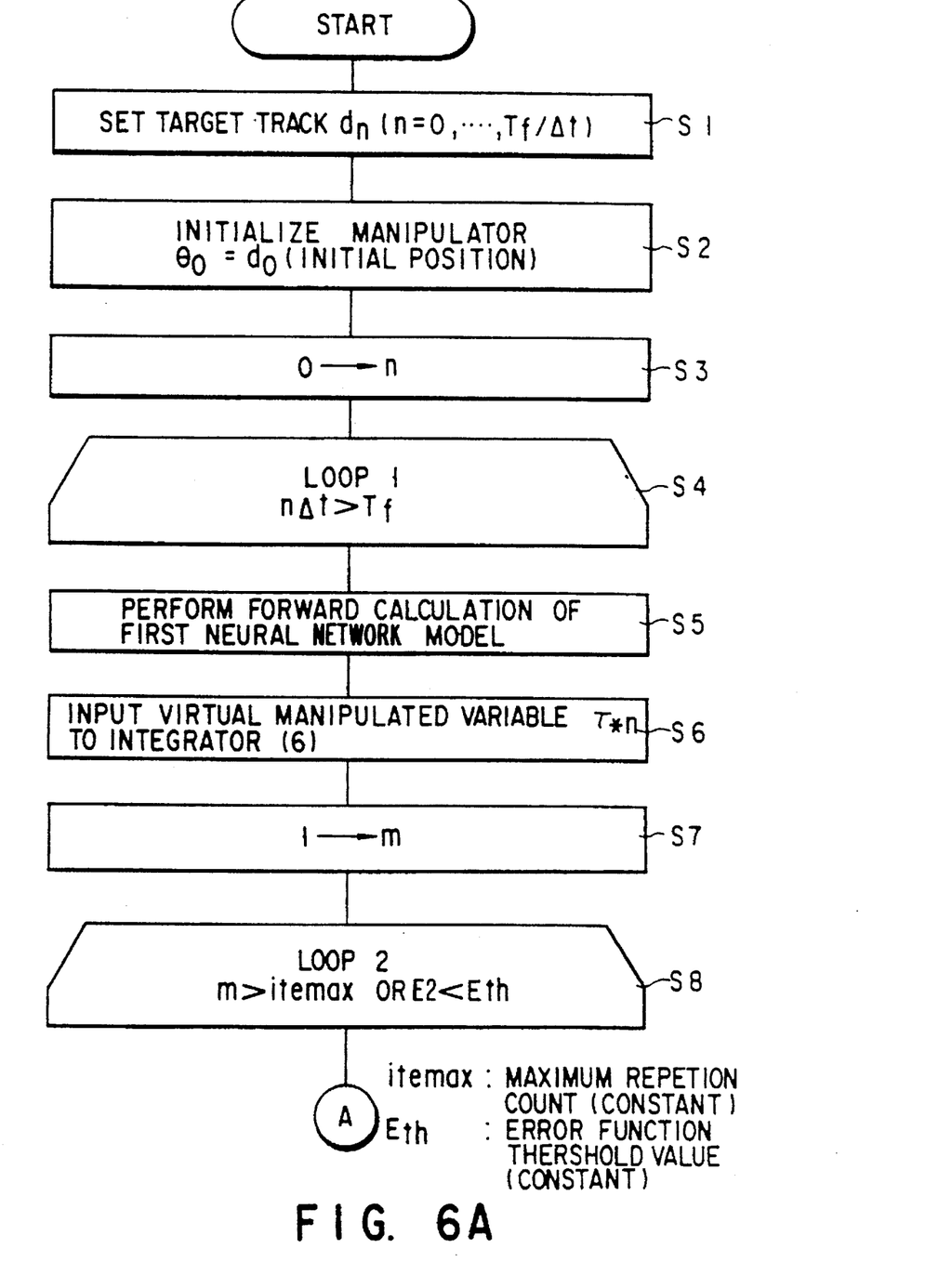
FIGS. 6A and 6B are flow charts showing calculation procedures.
Figure 6B:
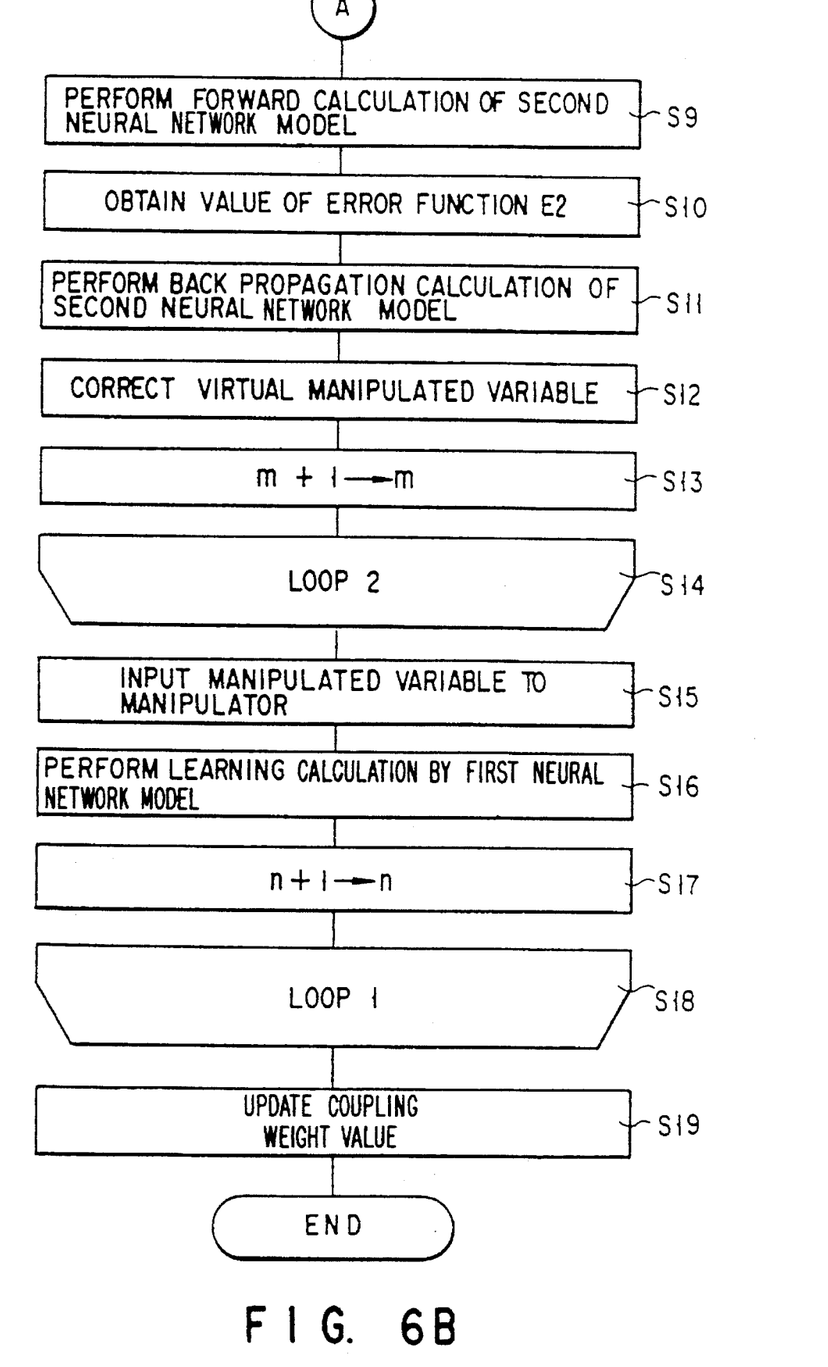

The calculation procedures of the control apparatus shown in FIG. 1 will be described with reference to flow charts in FIGS. 6A and 6B. These calculation procedures are repeated every sampling time. For this reason, the procedures for obtaining a manipulated variable at time $n\Delta t$ will be described below.

In the following description, reference symbol d denotes a target track; $d_n$ is a target controlled variable at time $n\Delta t$; $T_f$, the final time; itemax, a maximum count by which prediction and correction are repeated every sampling time; and $E_{th}$, a threshold value of the error function. When the repetition count reaches the maximum count itemax or the value of the error function becomes smaller than $E_{th}$, the calculation is completed.

A target controlled variable $d_n$ at time $n\Delta t$ is set (step S1). The initial state $\theta_0$ of the manipulator is set as initial value $d_0$ of a target controlled variable.

The initial value 0 is substituted into n (step S3).

The end condition of the first loop is set as $n\Delta t > T_f$ (step S4).

Target control quantities at time $n\Delta t$ and after one sampling period $\Delta t$, which are defined as follows:
$$d_{n+1} = (\theta^d_{1,n+1}, \theta^d_{2,n+1}, \Theta^d_{1,n+1}, \Theta^d_{2,n+1})$$
are input to the first neural network model 2, and the first neural network model 2 performs a forward calculation to output a virtual manipulated variable initial value $\tau_{*n}$ (step S5).

In this case, the first switch 7 is closed to the output side of the first neural network model 2, and the virtual manipulated variable initial value $\tau_{*n}$ is input to the integrator 6 as an initial value. An output value $\tau v_n$ from the integrator 6 becomes $\tau_{*n}$ (step S6).

$$\tau v_n = \tau_{*n}$$

One is substituted into m (step S7).

The end condition for the second loop is set to m>itemax or $E<E_{th}$ (step S8).

The virtual manipulated variable $\tau v_n$ output from the integrator 6 and the controlled variable $\theta_n$ measured through the feedback loop 4 are input to the second neural network model 3, and the second neural network model 3 outputs a predicted controlled variable $z_{n+1}$ after one sampling period and a predicted function angle $zpos_{n+2}$ after two sampling periods of the manipulator 1 as the controlled system. This calculation is the forward calculation in the second neural network model 3 (step S9).

Using a difference between the predicted controlled variable $z_{n+1}$ and the corresponding target value $d_{n+1}$, and a difference between the predicted joint angle $zpos_{n+2}$ and the corresponding target value $dpos_{n+2}$, which differences are obtained in step S9 and defined as follows:

$$\Delta\theta_{n+1} = d_{n+1} - z_{n+1}$$

$$\Delta\theta pos_{n+2} = dpos_{n+2} - zpos_{n+2}$$

an error function E2 is defined as follows (step S10):

$$E2 = (\Delta\theta_{n+1}^T \cdot \Delta\theta_{n+1} + \Delta\theta pos_{n+2}^T \cdot \Delta\theta pos_{n+2})/2$$

A correction amount $\Delta\tau_n$ of the virtual manipulated variable for reducing the error function E2 is obtained by the back propagation calculation of the second neural network model 3 (step S11). The back propagation calculation of the second neural network mode 3 will be described below.

The correction amount $\Delta\tau_n$ obtained in step S11 is input to the integrator 6 through the first switch 7. The virtual manipulated variable $\tau v_n$ as an output signal from the integrator 6 has a value added with this correction amount $\Delta\tau_n$ (step S12).

The value m is incremented (step S12). If the end condition for the second loop is not satisfied, the flow returns to step S8 (step S14). That is, the operations in steps S8 to S14 are repeated until the value of the error function E2 becomes the predetermined threshold value $E_{th}$ or less or the value m reaches the maximum repetition count itemax.

The corrected virtual manipulated variable $\tau_n$ is input as a manipulated variable to the manipulator 1 when the second switch 8 is closed at the sampling time $n\Delta t$ (step S15).

A correction amount of a coupling weight value and a threshold are computed in an error back propagation learning method by performing a learning calculation which uses a target controlled variable $d_n, d_{n+1}$ as an input signal and manipulated variable $\tau n$ as a teacher signal (step S16).

The value n is incremented (step S17), and the operations in steps S4 to S17 are repeated every sampling time from the time 0 to the final time $T_f$ (step S18).

The correction amount of the coupling weight value and the threshold obtained in step S16 are added to the coupling weight value and threshold value, respectively.

Learning of the first neural network model 2 using the forward calculation and the error back propagation method will be described below.

The forward calculation is a calculation performed in the neural network model until an output signal is generated after an input signal is received.

The first neural network model 2 causes its input-layer unit to receive the target controlled variables at the current time and after one sampling period as input signals as follows:

$xi_1 = \theta d_{1,n}$
$xi_2 = \theta d_{2,n}$
$xi_3 = \Theta d_{1,n}$
$xi_4 = \Theta d_{2,n}$
$xi_5 = \theta d_{1,n+1}$
$xi_6 = \theta d_{2,n+1}$
$xi_7 = \Theta d_{1,n+1}$
$xi_8 = \Theta d_{2,n+1}$ where $xi_i$ is the input value of the i-th unit of the input layer xi.

If the input/output function of the input-layer unit is given as an identity function, an output from the input-layer unit is represented as follows:

$$yi_i = xi_i \ (i = 1, \ldots, 8)$$

Each input value $xh_j$ ($j=1, \ldots, Nh1$) (where Nh1 is the number of intermediate-layer units) to an intermediate-layer unit is a value obtained by subtracting a threshold value $th_j$ of the intermediate-layer unit from a sum of values obtained by weighting an output value $yi_i$ of the input-layer unit with a coupling weight $w11_{j,i}$ between the input and intermediate layers.

The input value $xh_j$ is defined as follows:

$$xh_j = \sum_{i=1}^{8} w11_{j,i} \cdot yi_i - th_j$$

If the input/output function of the intermediate-layer unit is a sigmoid function as follows:

$$f(x) = 2/(1+\exp(x)) - 1,$$

the output value $yh_j$ from the intermediate-layer unit is written as follows using the input value $xh_j$:

$$yh_j = f(xh_j) \ (j=1, \ldots, Nh1)$$

An input value $xo_k$ ($k=1, 2$) to the output-layer unit is a value obtained by subtracting a threshold value $th_k$ of the output-layer unit from a sum of values obtained by weighting the output value $yh_j$ from the intermediate-layer unit with a coupling weight $w12_{k,j}$ between the intermediate and output layers and is represented as follows:

$$xo_k = \sum_{j=1}^{Nh1} w12_{k,j} \cdot yh_j - th_k$$

If the input/output function of the output-layer unit is defined as an identity function as follows:
$yo_k = xo_k (k=1, 2)$
and the output values of this output-layer unit are torques as follows:
$\tau_{*1,n} = yo_1$
$\tau_{*2,n} = yo_2$ In the learning calculation performed by the first neural network model 2, a correction amount of a coupling weight value is computed after a manipulated variable is supplied to a controlled system at each sampling time, and the coupling weight value is corrected after completion of a sequence of control operations.

A formula for computing the correction amount of the coupling weight value calculated at each sampling time will be explained, referring to the case of time $n\Delta t$.

An error function E1n is defined on the basis of an output value $\tau*1,n, \tau*2,n$ from the first neural network model 2 and a manipulated variable $\tau 1,n, \tau 2,n$.

$$E1_n = \frac{1}{2}((\tau_{1,n} - \tau^*_{1,n})^2 + (\tau_{2,n} - \tau^*_{2,n})^2)$$

A correction amount which reduces the value of the error function represented by this formula is computed. First of all, correction amounts of the output values of the elements of the output and intermediate layers are calculated, as follows:

$$\Delta yo_k = \frac{-\partial E1_n}{\partial yo_k}$$

$$= \tau_{1,n} - \tau^*_{1,n} \ (k=1)$$

$$= \tau_{2,n} - \tau^*_{2,n} \ (k=2)$$

$$\Delta yhj = -\frac{\partial E1_n}{\partial yh_j}$$

$$= -\sum_{k=1}^{2} \frac{\partial E1_n}{\partial yo_k} \frac{dyo_k}{dxo_k} \frac{\partial xo_k}{\partial yhj}$$

$$= \sum_{k=1}^{2} \Delta yo_k \omega 12_{k,j}(j=1,\ldots,Nh1)$$

By use of these values, the correction amounts are computed for the coupling weight value $\omega 12_{k,j}$ between the intermediate and output layers, the coupling weight value $\omega 11_{j,i}$ between the input and intermediate layers, the threshold value $tho_k$ of the output layer unit, and the threshold value $thh_j$ of the intermediate layer unit.

$$\Delta \omega 12^n_{kj} = -\epsilon \frac{\partial E1_n}{\partial \omega 12_{k,j}}$$

$$= -\epsilon \frac{\partial E1_n}{\partial yo_k} \frac{dyo_k}{dxo_k} \frac{\partial xo_k}{\partial \omega 12_{k,j}}$$

$$= \epsilon \Delta yo_k yh_j \ (j=1,\ldots,Nh1;k=1,2)$$

$$\Delta \omega 11^n_{j,i} = -\epsilon \frac{\partial E1_n}{\partial \omega 11_{j,i}}$$

$$= -\epsilon \frac{\partial E1_n}{\partial yh_j} \frac{dyh_j}{dxh_j} \frac{\partial xh_j}{\partial \omega 11_{j,i}}$$

$$= \epsilon \Delta yh_j f'(xh_j)yi_i (i=1,\ldots,8_{ij}=1,\ldots,Nh1)$$

$$\Delta tho_k^n = -\epsilon \frac{\partial E1_n}{\partial tho_k}$$

$$= -\epsilon \frac{\partial E1_n}{\partial yo_k} \frac{dyo_k}{dxo_k} \frac{\partial xo_k}{\partial tho_k}$$

$$= -\epsilon \Delta yo_k \ (k=1,2)$$

$$\Delta thh_j^n = -\epsilon \frac{\partial E1_n}{\partial thh_j}$$

$$= -\epsilon \frac{\partial E1_n}{\partial yh_j} \frac{dyh_j}{dxh_j} \frac{\partial xh_j}{\partial thh_j}$$

$$= -\epsilon \Delta yh_j f'(xh_j) \ (j=1,\ldots Nh1)$$

In the above formula, f'(x) is a derivative of an input/output function of the intermediate layer unit, and $\epsilon$ is a learning coefficient. In the manner expressed by the above formulas, the correction amount of the coupling weight value is calculated at each sampling time. After a sequence of control operations, the coupling weight value is corrected.

$$\omega 11_{j,i} = \omega 11_{j,i} + \sum_{n=1}^{N} \Delta \omega 11^n_{j,i}$$

$$\omega 12_{k,j} = \omega 12_{k,j} + \sum_{n=1}^{N} \Delta \omega 12^n_{k,j}$$

$$thh_j = thh_j + \sum_{n=1}^{N} \Delta thh_j^n$$

$$tho_k = tho_k + \sum_{n=1}^{N} \Delta tho_k^n$$

The forward calculation and the error back propagation calculation of the second neural network model 3 will be described below.

The forward calculation of the second neural network model 3 is a calculation until an output signal is generated after input signals are received in the same manner as in the first neural network model 2. The forward calculation of the second neural network model 3 is expressed as follows.

The virtual manipulated variable $\tau v_n$ and the measured controlled variable $\theta_n$ are input as input values $xi_i$ ($i=1,\ldots,6$) to the six units of the input layer of the second neural network model 3 as follows:

$xi_1 = \tau v_{1,n}$
$xi_2 = \tau v_{2,n}$
$xi_3 = \theta_{1,n}$
$xi_4 = \theta_{2,n}$
$xi_5 = \Theta_{1,n}$
$xi_6 = \Theta_{2,n}$ If the input/output function of the input-layer units is given as an identity function, output values $yi_i$ ($i=1,\ldots,6$) of the input-layer units are expressed as follows:

$$yi_i = xi_i \ (i=1,\ldots,6)$$

Each input value $xh_j$ ($j=1,\ldots,Nh2$) to each intermediate-layer unit is a value obtained by subtracting the threshold value $th_j$ of the intermediate-layer unit from a sum of values obtained by weighting the output value $yi_i$ from the input-layer unit with a coupling weight $w21_{j,i}$ between the input layer and the intermediate layer and is expressed as follows:

$$xh_j = \sum_{i=1}^{6} w21_{j,i} \cdot xi_i - th_j$$

If the input/output function of the intermediate-layer unit is expressed as a sigmoid function as follows:

$$f(x) = 2/(1+\exp(x))-1,$$

the output value $yh_j$ from the intermediate-layer unit can be expressed as follows using the input value $xh_j$:

$$yh_j = f(xh_j) \ (j=1,\ldots,Nh2)$$

where Nh2 is the number of intermediate-layer units.

An input value $xo_k$ ($k=1,\ldots,6$) to each output-layer unit is a value obtained by subtracting a threshold value $th_k$ of the output-layer unit from a sum of values obtained by weighting the output value $yh_j$ from the intermediate-layer unit with a coupling weight $w22_{k,j}$ between the intermediate layer and the output layer and is expressed as follows:

$$xo_k = \sum_{j=1}^{Nh2} w22_{k,j} \cdot xh_j - th_k$$

The input/output function of the output-layer unit is given by the following identity function:

$$yo_k = xo_k \ (k=1,\ldots,6)$$

The output values from this output-layer unit are the controlled variable predicted value after one sampling period and the joint angle predicted value after two sampling periods:

$z_{1,n+1} = yo_1$
$z_{2,n+1} = yo_2$
$Z_{1,n+1} = yo_3$
$Z_{2,n+1} = yo_4$
$z_{1,n+2} = yo_5$
$z_{2,n+2} = yo_6$
$z_{n+1} = (z_{1,n+1}, z_{2,n+1}, Z_{1,n+1}, Z_{2,n+1})^T$
$zpos_{n+2} = (z_{1,n+2}, z_{2,n+2})^T$ The forward calculation has been described above.

Using the predicted values obtained in the above forward calculation:
$$d_{n+1}=(d_{1,n+1}, d_{2,n+1}, D_{1,n+1}, D_{2,n+1})^T$$
$$dpos_{n+2}=(d_{1,n+2}, d_{2,n+2})^T$$
and the differences between these predicted values and the target controlled variables, an error function E is defined as follows:

$$\Delta\theta_{n+1}=d_{n+1}-z_{n+1}$$

$$\Delta\theta pos_{n+2}=dpos_{n+2}-zpos_{n+2}$$

$$E2=(\Delta\theta_{n+1}^T\cdot\Delta\theta_{n+1}+\Delta\theta pos_{n+2}^T\cdot\Delta\theta pos_{n+2})/2$$

The error back propagation calculation for obtaining a correction value for the input signal to nullify the value of the error function E2 will be described below.

The second neural network model 3 sequentially calculates correction values for the unit output values so as to reduce the error function values in units of layers from the input to output layers and finally performs a calculation for obtaining the correction value for the output-layer units.

The correction values of the output values from the output-layer units are calculated as follows:

$$\begin{aligned}\Delta yo_k &= \frac{\partial E2}{\partial yo_k} \\ &= -\Delta\theta_{1,n+1} \ (k=1) \\ &= -\Delta\theta_{2,n+1} \ (k=2) \\ &= -\Delta\Theta_{1,n+1} \ (k=3) \\ &= -\Delta\Theta_{2,n+1} \ (k=4) \\ &= -\Delta\theta_{1,n+2} \ (k=5) \\ &= -\Delta\theta_{2,n+2} \ (k=6)\end{aligned}$$

The correction values for the output values from the intermediate-layer units are expressed using the correction values for the output-layer units:

$$\begin{aligned}\Delta yh_j &= \frac{\partial E2}{\partial yh_j} \\ &= \sum_{k=1}^{6} \frac{\partial E2}{\partial yo_k}\cdot\frac{dyo_k}{dxo_k}\cdot\frac{\partial xo_k}{\partial yh_j} \\ &= \sum_{k=1}^{6} \Delta yo_k \cdot w22_{k,j} \ (j=1,\ldots,Nh1)\end{aligned}$$

Similarly, the correction values for the output values from the input-layer units are expressed as follows using the correction values for the intermediate-layer units:

$$\begin{aligned}\Delta yi_i &= \frac{\partial E2}{\partial yi_i} \\ &= \sum_{j=1}^{Nh2} \frac{\partial E2}{\partial yh_j}\cdot\frac{dyh_j}{dxh_j}\cdot\frac{\partial xh_j}{\partial yi_i} \\ &= \sum_{j=1}^{Nh2} \Delta yh_j \cdot f'(xh_j) \cdot w21_{ji}\end{aligned}$$

where $f'(xh_j)$ is a differential value of the sigmoid function, and is expressed as follows:

$$f'(xh_j)=\{(1+f(xh_j))\cdot(1-f(xh_j))\}/2$$

Finally, correction values for the inputs from the integrator 6, which inputs are included in the input signal, are expressed using a constant $\eta$ as follows:

$$\Delta\tau_{1,n}=-\eta\Delta yi_1$$

$$\Delta\tau_{2,n}=-\eta\Delta yi_2$$

The correction amounts are input to the integrator 6 through the first switch 7.

As described above, according to the present invention, there is provided a control method and apparatus capable of accurately controlling a nonlinear controlled system a mathematical model of dynamic characteristics of which is unknown and a nonlinear controlled system having highly nonlinear dynamic characteristics, and capable of compensating a deviation of a controlled variable which is caused by a disturbance.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A control method of controlling a controlled system, comprising:

the first step of inputting current and future target controlled variables to a first neural network model and causing the first neural network model to execute a forward calculation to output a virtual manipulated variable initial value;

the second step of causing a second neural network model to receive the virtual manipulated variable initial value obtained in the first step as a virtual manipulated variable and a controlled variable obtained from said controlled system at a current time, and causing the second neural network model to execute a forward calculation to output a predicted controlled variable;

the third step of obtaining an error of the predicted controlled variable obtained in the second step with respect to the future target controlled variable;

the fourth step of obtaining a correction amount for the virtual manipulated variable in accordance with a back propagation calculation of said second neural network model, using the error obtained in the third step, thereby correcting the virtual manipulated variable in accordance with the correction amount;

the fifth step of outputting the virtual manipulated variable corrected in the fourth step to the controlled system as a manipulated variable; and the sixth step of causing the first neural network model to perform learning in an error back propagation learning method, using as a teacher signal the virtual manipulated variable output to the controlled system.

2. A method according to claim 1, wherein the third step includes the step of obtaining an error of the predicted controlled variable with respect to the future target controlled variable on the basis of at least one of a predicted controlled variable after one sampling period and a predicted controlled variable after two sampling periods.

3. A method according to claim 1, wherein the fifth step includes the step of outputting the corrected virtual manipulated variable to the controlled system after the second to fourth steps are repeated by a predetermined number of times.

4. A method according to claim 1, wherein the fifth step includes the step of outputting the corrected virtual manipulated variable to said controlled system after the second to fourth steps are repeated until the error of the predicted controlled variable with respect to the future target controlled variable reaches not more than a predetermined value.

5. A control method of controlling a controlled system, comprising:

the first step of providing a second neural network model having learnt to predict a behavior of the controlled system;

the second step of inputting current and future target controlled variables to a first neural network model and causing the first neural network model to execute a forward calculation to output a virtual manipulated variable initial value;

the third step of causing the second neural network model to receive the virtual manipulated variable initial value obtained in the first step as a virtual manipulated variable and a controlled variable obtained from said controlled system at a current time, and causing the second neural network model to execute a forward calculation to output a predicted controlled variable;

the fourth step of obtaining an error of the predicted controlled variable obtained in the third step with respect to the future target controlled variable;

the fifth step of obtaining a correction amount for the virtual manipulated variable in accordance with a back propagation calculation of said second neural network model, using the error obtained in the fourth step, thereby correcting the virtual manipulated variable with the correction amount;

the sixth step of outputting the virtual manipulated variable corrected in the fifth step to the controlled system as a manipulated variable; and the seventh step of causing the first neural network model to perform learning in an error back propagation learning method, using as a teacher signal the virtual manipulated variable output to the controlled system.

6. A method according to claim 5, wherein the fourth step includes the step of obtaining an error of the predicted controlled variable with respect to the future target controlled variable on the basis of at least one of a predicted controlled variable after one sampling period and a predicted controlled variable after two sampling periods.

7. A method according to claim 5, wherein the sixth step includes the step of outputting the corrected virtual manipulated variable to the controlled system after the second to fifth steps are repeated by a predetermined number of times.

8. A method according to claim 5, wherein the sixth step includes the step of outputting the corrected virtual manipulated variable to said controlled system after the second to fifth steps are repeated until the error of the predicted controlled variable with respect to the future target controlled variable reaches not more than a predetermined value.

9. A control apparatus for controlling a controlled system, comprising:

a first neural network model for receiving current and future target controlled variables to obtain a current virtual manipulated variable initial value;

a second neural network model for receiving a current controlled variable obtained from the controlled system and a virtual manipulated variable whose initial value is the virtual manipulated variable initial value obtained from the first neural network model, for outputting a predicted controlled variable, and for calculating a correction amount for the virtual manipulated variable by executing an error back propagation calculation on the basis of an error between the predicted controlled variable and the future target controlled variable; and means for correcting the virtual manipulated variable using the correction amount and the virtual manipulated variable and outputting the corrected virtual manipulated variable to the controlled system.

10. An apparatus according to claim 9, further comprising a subtracter for subtracting the predicted controlled variable obtained in said second neural network model from the future target controlled variable and outputting a difference to said second neural network model.

11. An apparatus according to claim 9, further comprising:

an integrator for accumulating the virtual manipulated variable and the correction amount;

a first switch for establishing connection to the first neural network model so as to receive the virtual manipulated variable initial value output from the first neural network model as an initial value of the virtual manipulated variable, and then establishing connection to the second neural network model so as to receive the virtual manipulated variable correction amount computed by the second neural network model; and a second switch for supplying an output from said integrator to the controlled system under a predetermined condition.

12. An apparatus according to claim 9, wherein said first neural network model calculates a correction amount of a coupling weight value by performing a learning calculation which uses the manipulated variable as a teacher signal after the manipulated variable is supplied to the controlled system at each sampling time, and corrects the coupling weight value after completion of a sequence of control operations.

13. An apparatus according to claim 9, wherein said second neural network model has been previously trained to predict a behavior of the controlled system.

14. An apparatus according to claim 9, wherein said second neural network model includes:

means for receiving the virtual manipulated variable and the current controlled variable to obtain a predicted controlled variable;

means for obtaining an error of the predicted controlled variable with respect to the future target controlled variable; and means for obtaining a correction amount for the virtual manipulated variable using the error.

15. An apparatus according to claim 14, wherein said means of obtaining an error includes means for obtaining an error of the predicted controlled variable with respect to the future target controlled variable on the basis of at least one of a predicted controlled variable after one sampling period and a predicted controlled variable after two sampling periods.

16. An apparatus according to claim 14, wherein said second neural network model included means for outputting the virtual manipulated variable to the controlled system when the error reaches not more than a predetermined value.

* * * * *

UNITED STATES PATENT AND TRADEMARK OFFICE
CERTIFICATE OF CORRECTION

PATENT NO. : 5,566,275
DATED : October 15, 1996
INVENTOR(S) : Makoto Kano

It is certified that error appears in the above-indentified patent and that said Letters Patent is hereby corrected as shown below:

On title page under Foreign Application Priority Data, please delete "Feb 26, 1993 [JP] Japan......................5-46205

Signed and Sealed this

Eleventh Day of March, 1997

Attest:

BRUCE LEHMAN

*Attesting Officer*   Commissioner of Patents and Trademarks